United States Patent [19]

Nosaka et al.

[11] Patent Number: 4,473,260
[45] Date of Patent: Sep. 25, 1984

[54] BEARING RETAINER

[75] Inventors: Masataka Nosaka; Masataka Kikuchi, both of Miyagi, Japan

[73] Assignee: The Director of National Aerospace Laboratory of Science and Technology Agency, Tokyo, Japan

[21] Appl. No.: 476,930

[22] Filed: Mar. 21, 1983

[30] Foreign Application Priority Data

Apr. 16, 1982 [JP] Japan .................................. 57-63407

[51] Int. Cl.³ ............................................ F16C 33/38
[52] U.S. Cl. .................................................. 308/201
[58] Field of Search ................... 308/201, 188, 189 R, 308/189 A, 193

[56] References Cited

U.S. PATENT DOCUMENTS 3,447,341  6/1969  Miller .................................... 308/201
4,386,811  6/1983  Heemskerk et al. ................. 308/188

Primary Examiner—Lenard A. Footland
Attorney, Agent, or Firm—Shapiro and Shapiro

[57] ABSTRACT

A retainer for bearing having a ball confining pocket in an oval shape, which is defined by a pair of semi-circles and a rectangular space between the semi-circles, each semi-circle having a radius substantially corresponding to the radius of the ball, and the rectangular space having a short side length corresponding to a clearance between the ball and the pocket surface and a long side length corresponding to a diameter of the ball.

1 Claim, 4 Drawing Figures

BEARING RETAINER

BACKGROUND OF THE INVENTION

1. Field of the Invention

This invention relates to a retainer for bearing. More particularly, it is concerned with a retainer for bearing having a pocket in an oval shape.

2. Description of the Prior Art

A ball bearing has been, and is, of such a construction that, as shown in FIGS. 1 and 2 of the accompanying drawing, it has an inner ring 1, an outer ring 2, a ball 3 hold between the inner and the outer rings, and a retainer 4 with a pocket 5 for confining the ball within its inner surface.

An oil-lubricating or self-lubricating type retainer is made of a base material, either inorganic or organic (such as sintered alloy, plastics, etc.), which is impregnated with a solid lubricant like molybdenum disulfide, graphite, and others.

In actual use, the self-lubricating retainer 4 applies the solid lubricant to the surface of the ball 3 through the pocket surface of the retainer, thereby lubricating the rolling surfaces of the inner and outer rings 1, 2.

This type of the pocket 5 in the ball retainer 4 is formed in a true circle having a diameter greater than that of the ball 3.

Since such conventional retainer 4 having the pocket 5 in true circle requires a pocket clearance (a difference between the inner diameter of the pocket and the diameter of the ball) to be at a certain value or greater, the following inconveniences would take place.

(1) A contact area at a contact part 6 between the ball 3 and the pocket surface is small, hence a mean surface pressure at the contact part becomes high to result in considerable wear at that part.

(2) The small contact area between the ball 3 and the pocket surface causes decreased supply of the self-lubricant from the retainer to the rolling surface of the ball 3 with the consequent increase in frictional resistance.

SUMAMRY OF THE INVENTION

It is therefore an object of the present invention to provide an improved bearing retainer, in which the pocket of the retainer is changed somewhat to eliminate the abovementioned inconveniences.

According to the present invention, in general aspect thereof, there is provided a ball bearing, comprising an inner ring, an outer ring, a ball rotatably held between said inner and outer rings, and a ball retainer interposed between said inner and outer rings to confine rolling movement of the ball within a pocket surface defined therein, the pocket of said bearing retainer being in an oval shape which is defined by a pair of semicircles and a rectangular region in the middle of said pair of semicircles, each of said semi-circles having a radius ($r_a$) which approximates to a radius ($r_b$) of the ball, and said rectangular region between said semicircles having a short side length ($\Delta c$) corresponding to an amount of clearance between the pocket and the ball and a long side length corresponding to a diameter ($2r_a$) of said semi-circle.

The foregoing object, other objects, and specific construction of the bearing retainer according to the present invention will become more apparent and understandable from the following detailed description thereof when read in connection with the accompanying drawing.

DESCRIPTION OF THE PREFERRED EMBODIMENT

In the following, the present invention will be described in detail with reference to a preferred embodiment thereof as illustrated in the accompanying drawing.

Figure 1:
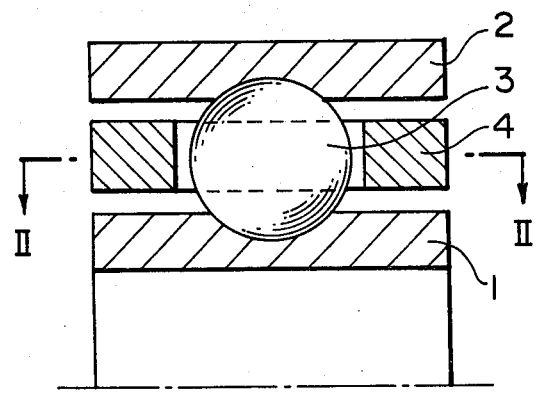
FIG. 1 is a side elevational view, partly in cross-section, of a conventional bearing.
Figure 2:
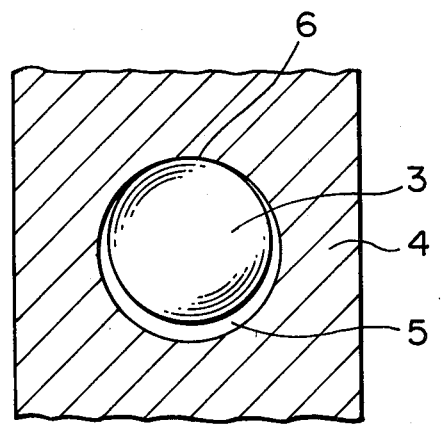
FIG. 2 is a plan view, in cross-section of the bearing shown in FIG. 1, taken along a line II—II.
Figure 3:
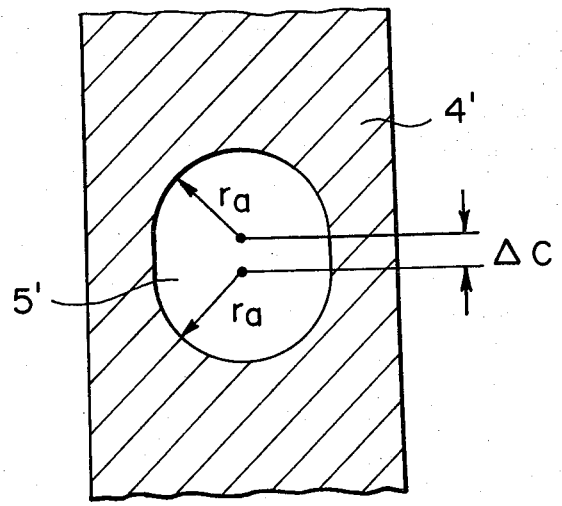
FIG. 3 is a partial plan view of a bearing retainer showing a pocket of the retainer according to the present invention.
Figure 4:
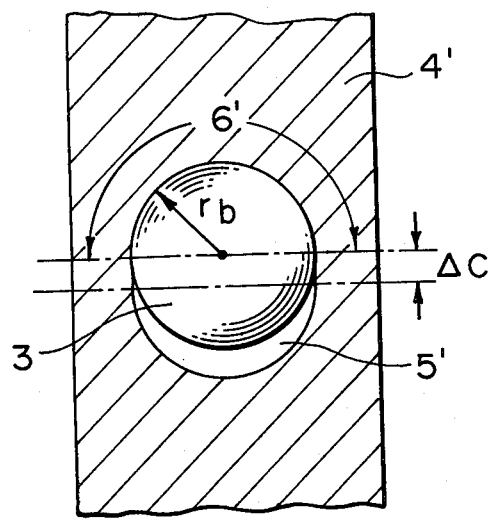
FIG. 4 is also a partial plan view showing a relationship between the ball and the retainer according to the present invention.

As shown specifically in FIGS. 3 and 4, the pocket 5' of the retainer 4' is formed in an oval shape with two semi-circles and a rectangular region interposed between the semi-circles. Each of the semi-circles has a radius ($r_a$) substantially corresponding to a radius ($r_b$) of the ball 3, and the rectangular region to be provided between the two semi-circles is coincident with an amount ($\Delta c$) of the clearance between the pocket and the ball (a difference between the inner diameter of the pocket and the diameter of the ball).

As a result of forming the retainer pocket as such, the contact area at the contact part 6' between the ball 3 and the inner surface of the pocket 5' of the retainer 4' can be increased. In addition, any unfittingness in the retainer is eliminated to secure stabilized motion of the retainer at high speed revolution and favorable lubrication of the bearing.

Thus, the bearing retainer according to the present invention provides the following effects.

(1) The contact area between the ball and the inner surface of the pocket increases, which contributes to reduction in the mean surface pressure and increase in supply of the self-lubricant from the retainer to the rolling surface of the ball, thereby decreasing wear of the contact surface between the ball and the pocket.

(2) Deflection of the retainer in its axial direction (due to supply of coolant, for example) and its unfittingness can be perfectly eliminated, thereby making it possible to secure sufficient contact surface between the ball and the pocket surface and to prevent the bearing from vibration.

(3) There is no possibility of the wall thickness getting thin at the side surface of the retainer pocket, hence the retainer can maintain its mechanical strength.

(4) In the case of the oil lubricating type bearing, increase in the contact area between the ball and the inner surface of the pocket contributes to increase in the hydrodynamic pressure effect due to the lubricating oil, whereby the ball is properly separated from the side wall of the retainer to reduce wear to occur at the contact part between the ball and the pocket surface.

(5) Absence of unfittingness with the retainer would avoid excessive contact between the guide surface of the retainer and the inner and outer rings. On account of this, seizure of the guide surface can be prevented to increase frequency of its use.

Although, in the foregoing, the present invention has been described specifically with reference to a preferred embodiment thereof, it is apparent that any changes and modifications may be made by those skilled in the art within the ambit of the present invention as set forth in the appended claim.

We claim:

1. A bearing retainer for constituting a bearing together with an inner ring, an outer ring, a ball rotatably held between said inner and outer rings and interposed between said inner and outer rings to confine rolling movement of the ball within a pocket surface defined therein, characterized by the pocket of said bearing retainer being in an oval shape which is defined by a pair of semi-circles and a rectangular region in the middle of said pair of semi-circles, each of said semi-circles having a radius ($r_a$) which approximates to a radius ($r_b$) of the ball, and the rectangular region between said semicircles having a short side length ($\Delta c$) corresponding to an amount of clearance between the pocket and the ball and a long side length corresponding to a diameter ($2r_a$) of the semi-circle.

* * * * *